United States Patent [19]
Sakamoto et al.

[11] Patent Number: 5,005,164
[45] Date of Patent: Apr. 2, 1991

[54] RECORDING AND REPRODUCING APPARATUS

[75] Inventors: Noriaki Sakamoto, Kyoto; Shigemi Maeda, Yamatokortyama; Toshihiro Yamanaka, Ikoma; Toshihisa Deguchi, Nara; Nobuyuki Horie, Yamatokoriyama; Takeshi Yamaguchi; Kunio Kojima, both of Nara, all of Japan

[73] Assignee: Sharp Kabushiki Kaisha, Osaka, Japan

[21] Appl. No.: 186,580

[22] Filed: Apr. 27, 1988

[30] Foreign Application Priority Data

| Apr. 28, 1987 | [JP] | Japan | 62-105616 |
| Apr. 28, 1987 | [JP] | Japan | 62-107102 |
| Apr. 28, 1987 | [JP] | Japan | 62-107104 |
| May 13, 1987 | [JP] | Japan | 62-117574 |

[51] Int. Cl.⁵ .................................................. G11B 7/00
[52] U.S. Cl. ........................................ 369/48; 369/59; 369/116
[58] Field of Search ............... 369/48, 54, 116, 59; 346/76 L

[56] References Cited

U.S. PATENT DOCUMENTS

| 4,157,568 | 6/1979 | Ohki et al. | 369/116 X |
| 4,488,277 | 10/1984 | McFarlane et al. | 369/48 |
| 4,549,288 | 10/1985 | Chan | 369/54 R |
| 4,866,692 | 9/1989 | Saito et al. | 369/116 X |
| 4,873,680 | 10/1989 | Chung et al. | 369/116 X |

FOREIGN PATENT DOCUMENTS 59-60742 4/1984 Japan.

Primary Examiner—Donald McElheny, Jr.
Attorney, Agent, or Firm—Birch, Stewart, Kolasch & Birch

[57] ABSTRACT

A recording and reproducing apparatus is provided which includes a recording condition control device for controlling recording conditions during recording of a binary-coded original recording signal on a recording medium, a signal recording device for recording the original recording signal onto the recording medium according to recording conditions set by the recording condition control device, a reproducing signal output device for outputting binary-coded reproducing signals by detecting the recording signal as recorded on the recording medium by the signal recording device, and a recording condition setting device for obtaining the recording conditions to provide a reproducing signal approximately equal to the original recording signal through a comparison between the reproducing signal outputted from the reproducing signal output device and the original recording signal.

17 Claims, 12 Drawing Sheets

RECORDING AND REPRODUCING APPARATUS

BACKGROUND OF THE INVENTION

The present invention generally relates to a recording and reproducing arrangement, and more particularly, to an optical information recording and reproducing apparatus such as an optical disc apparatus or the like having a highly reliable operation and having highly accurate recording and reproducing functions.

Recently, there has been developed an optical disc apparatus arranged for recording information on an optical disc by irradiating a laser light beam converged into a spot of light, onto the surface of the rotating optical disc, or for reproducing the information thus recorded on the disc. Since the optical disc apparatus as referred to above employs the laser light beam, the apparatus has such advantages that the track density may be made higher by more than one digit than the track density in a magnetic disc, thus making it possible to realize a memory of a large capacity. Moreover, because the construction for positioning a recording/reproducing head can be effected through non-contact by a pre-groove preliminarily cut on the disc surface, the optical disc may be readily replaced or exchanged.

However, in the known optical disc apparatus as described above, since scattering in the recording sensitivity is present among optical discs and moreover, recording and reproducing characteristics are markedly varied by temperature characteristics of laser elements, discs, etc., the recording and reproducing apparatus must be adjusted at a high accuracy. Accordingly, it has been required to provide large restrictions for a recording and reproducing characteristic allowable range of the optical discs, and a working circumstance allowable range of the recording and reproducing apparatus.

In order to overcome the disadvantages as described above, there has conventionally been proposed a practice for setting the power of the laser light beam during recording so that a fundamental wave of the reproducing signal is at the maximum power, or a practice for measuring the pulse length of the reproducing signal per each bit to obtain the recording pulse length so that the pulse length is at a predetermined length.

The above known practices for recording and reproduction still have problems in the detecting accuracy and reliability with respect to signals containing defects of discs or signals having jitters or fluctuations. Also, it is necessary for recording patterns of a special format suitable for the judging method to be adopted during actual application.

Meanwhile, there have also been developed recently various optical information recording and reproducing apparatuses arranged to converge a light beam emitted from a light source, such as a laser light source, onto a memory medium formed on a disc rotating at a constant speed for effecting recording, reproduction and/or erasing of digital information data.

In the above optical information recording and reproducing apparatuses, the reflecting light amount of the light beam, which is being projected onto the surface of the medium, reproduces signals varying in accordance to marks formed on the medium surface. For recording or erasing the signals, a light beam at a higher output than the output during reproduction is irradiated onto the medium surface. Thereby, signals are recorded or erased through the formation or elimination of the marks referred to above by the energy of light absorbed within the medium.

More specifically, recording of the information is effected by the presence or absence of marks corresponding to the amount of light incident upon a signal reproducing optical detector. As a general practice, original information data is subjected to digital modulation for band region restriction with respect to frequency characteristics of the recording/reproducing system, with the presence or absence of the marks corresponding to "1" and "0" digital values. Therefore, marks of a plurality of different lengths are required to be formed on the medium depending on the modulating system.

Conventionally, in the practice as described above, for the formation of marks of the plurality of different lengths $L(n)$, since an accurate recording cannot be effected by merely emitting the high output beam only during the time required for movement, the beam is emitted as a high output for the time represented by $(T(n)+\Delta T)$, with respect to the time $T(n)$ necessary for the beam center to move by the length $L(n)$ on the medium surface and the value for $\Delta T$ is set to be constant irrespective of the values of n. (where $n=1,2,3,\ldots,n$).

However, in the conventional optical information recording and reproducing apparatus as described above, in the case where the formation of the marks is to be effected by utilizing heat generated by the light energy absorbed within the medium (referred to as a heat mode recording), heat diffusion with respect to the distribution of the converged light beam on the medium surface is brought into question. When a line recording density on the medium becomes higher, there has been such a problem that the plurality of kinds of marks as described cannot be formed by the uniform correction as described above.

Moreover, in a conventional optical disc apparatus employing, for example, in an optical magnetic disc for a recording medium, the apparatus is so arranged that, when a weak magnetic field is applied to a vertical magnetization film of the optical magnetic disc in a direction of magnetization inversion, a laser light spot is projected to locally heat the vertical magnetization film above the curie point. Thereby, the magnetic field thereat is inverted for recording of pits, while a laser light flux is projected onto the pits for detecting the rotation of the polarized face of the reflected light or transmitted light for effecting the reproduction. For the recording of the information, as illustrated in FIG. 17, the digital information of "1" and "0" is modulated into the laser driving pulse so as to turn on or off the laser light. The laser light beam having the set power during the recording above a predetermined value $P_0$, which is necessary for the recording, is projected onto the disc being rotated at an equal speed. As a result, the recording pulse having a pulse length tw is recorded. However, in the above arrangement, because the recording is effected by the heating of the disc as described earlier, it is necessary to accurately control the on time and the power of the laser light in order to achieve the identical recording state. For this purpose, in the conventional optical disc apparatus, an adjusting knob is provided for an initial setting of the power and the recording pulse length of the recording laser light according to ambient temperatures affecting the recording quality.

Furthermore, due to the fact that the parameters affecting the recording quality of the optical disc apparatus as described above include, besides the ambient temperatures referred to above, various other factors such as variations in the recording sensitivity of the optical disc due to the temperature rise within the apparatus after turning on the power source, changes in time of the laser optical system, scattering of the recording sensitivity between the optical discs, differences in the peripheral speeds at inner and outer peripheries of the disc in the case of a disc constant speed rotating system, etc., it is difficult, in the actual application, to stably record the identical recording data with a desired reliability on the optical disc only through the initial adjustment of the recording conditions described earlier. Accordingly, there are brought about such problems as complication in the adjustment of the apparatus, loss of data interchangeability of the apparatus between the optical discs, and lowering of dependability of the apparatus.

SUMMARY OF THE INVENTION

Accordingly, an essential object of the present invention is to provide a recording and reproducing apparatus which is provided with a highly accurate recording condition automatic setting function, and which is capable of stably functioning with respect to defects of optical discs.

Another object of the present invention is to provide a recording and reproducing apparatus of the above described type which is so arranged that, by always monitoring the recording/reproducing state during normal recording and reproducing checking, and by resetting the recording conditions at all times to be within a predetermined recording state range reduction of waiting time is urged with respect to the recording-/reproducing requests from a host control device, the state of recording can be accommodated within a specific range.

A further object of the present invention is to provide an optical information recording and reproducing apparatus which can effect favorable recording corrections when marks of a plurality of different lengths are to be recorded on a medium, by altering the amount of recording corrections in accordance to the lengths of the desired marks.

A still further object of the present invention is to provide an optical disc device having a self-diagnosing function capable of properly controlling the power of the recording laser light and the recording pulse length to optimum values according to variations of various parameters affecting the recording quality of the optical discs, which is able to stably record reliable high quality data on the optical discs.

In accomplishing these and other objects, according to one embodiment of the present invention, there is provided a recording and reproducing apparatus which comprises recording condition control means for controlling recording conditions during the recording of a binary-coded original recording signal on a recording medium, signal recording means for recording the original recording signal onto said recording medium according to recording conditions set by said recording condition control means, reproducing signal output means for outputting binary-coded reproducing signal by detecting the recording signal as recorded on the recording medium by said signal recording means, and recording condition setting means for obtaining the recording conditions to provide a reproducing signal approximately equal to the original recording signal by a comparison between the reproducing signal outputted from said reproducing signal output means and said original recording signal.

By the above arrangement of the present invention, upon inputting the binary-coded original signal into the recording condition control means, said original recording signal is recorded on the recording medium by the signal recording means according to the recording conditions varied by said recording condition control means. On the other hand, during reproduction, the recording signal recorded on the recording medium is detected by the reproducing signal output means, and the binary-coded reproducing signal is outputted. Thus, the above reproducing signal is compared with the original recording signal by the recording condition detecting means, and the recording conditions are developed for obtaining the reproducing signal generally equal to the original recording signal. Accordingly, by the recording and reproducing apparatus of the present invention, the optimum recording conditions may be stably obtained at all times.

In another embodiment of the present invention, there is provided a recording and reproducing apparatus which comprises recording pulse length control means capable of varying the recording pulse length or recording laser light beam generating means capable of varying the recording laser light beam power, and means for counting a length for a predetermined time or for a predetermined number of bits, of the bits at the recorded side or the unrecorded side for reproducing or recording/reproduction signals. The recording and reproducing apparatus has a recording condition self-diagnosing function, for effecting the recording while successively varying the recording pulse length or the recording laser light beam power through employment of said recording pulse length control means or said recording laser light beam generating means. Thereby, conforming recording pulse length or recording laser beam power based on result of counting of said counting means is set and the counting means functions only when the recording by an instruction from an ordinary host control device, and/or reproduction checking is performed so that said self-diagnosing function is effected in the case where the result of the counting is out of a predetermined range with respect to a predetermined reference value.

By the above embodiment of the present invention, the recording/reproducing state is monitored by counting, through the counting means, the length for a predetermined time or for a predetermined number of bits, of the bits at the recorded side or the unrecorded side for a reproducing signal or recording/reproducing signals, during a normal recording and reproduction checking period. By judging whether or not the result of the counting is within a predetermined range with respect to a reference value, if the result is out of the specific range, the recording pulse length control means or the recording laser light beam generating means is controlled by executing the recording condition self-diagnosing function so as to accommodate the result within the specific recording state range. Thereby, it is possible to record under the optimum recording conditions at all times.

In a further embodiment of the present invention, there is provided an optical information recording and reproducing apparatus which comprises a light source from a laser beam and the like for forming marks in a plurality of different lengths on a recording medium so as to record information data thereon, and recording correcting means for effecting different corrections for the marks of the respective lengths i.e. for altering the amount of correction per mark of each length during the formation of said marks to be stored as data on said recording medium.

Accordingly, in the above arrangement of the present invention, it is possible to record by altering the recording correction amount according to the lengths of marks. Thus, an accurate recording to the data of the recorded marks can be achieved.

In still another embodiment of the present invention, there is provided an optical disc apparatus which comprises pick-up driving means for controlling the irradiating position of a laser light beam onto an optical disc, memory means for storing an optimum condition table in which the optimum value of the recording laser beam light power with respect to parameters affecting the recording quality are adapted to correspond to the optimum value of the recording pulse length, measuring means for measuring the values of said recording laser beam light power, recording pulse length and parameters, deviation detecting means for detecting the deviation between the optimum values of the recording laser light beam power and of the recording pulse length to be determined by said optimum condition table based on the values of the parameters as measured by said measuring means and the recording laser light beam power and the recording pulse length measured by said measuring means, and laser control means for controlling the recording laser light beam power and recording pulse length so as to eliminate said deviation based on signal from said deviation detecting means.

By way of example, it is assumed that the parameters affecting the recording quality are ambient temperatures and disc radial positions, and that the memory means stores therein as the optimum condition tables, the comparison table between the ambient temperatures and the optimum recording laser light power, and the comparison table between the disc radial positions and the optimum recording pulse lengths.

When the automatic adjusting process is started upon the functioning of the pick-up driving means of the optical disc device, the measuring means and the laser control means, the measuring means takes measurements of the power of the recording laser light during the recording, the recording pulse length, the ambient temperature, and the disc radial position of the track subjected to the automatic adjusting processing. Meanwhile, the deviation detecting means detects the deviation of the optimum recording laser light power and the optimum recording pulse length determined by the above comparison tables of the memory means based on the ambient temperature measured by the above measuring means and the disc radial position of the track effecting the automatic adjusting processing, with respect to the recording laser light power and the recording pulse length as measured by the above measuring means.

The detected deviation is, for example, a negative value due to the ambient temperature rising with respect to the recording laser light power, while the detected deviation is a positive value or negative value with respect to the recording pulse length, due to slippage, etc. in the recording sensitivity. Therefore, the laser control means reduces the power of the recording laser light for removing the above deviation, while correcting the comparison tables by increasing or decreasing the recording pulse length.

Upon completion of the automatic adjusting process in the manner as described above, the normal recording/reproducing processing are performed under the optimum conditions based on the above corrected comparison tables up to the subsequent automatic adjusting process. It is to be noted here that, if the above automatic adjusting processing is arranged to be effected on an exclusive track on the optical disc, measurements of the recording laser light power and recording pulse length, and the corrections of the deviation may be performed only on the above exclusive track. Thereby, the comparison tables are corrected by the corrected values, with the comparison tables after the corrections being held until the subsequent automatic adjusting process so as to be used on the user track on the optical disc.

BRIEF DESCRIPTION OF THE DRAWINGS

These and other objects and features of the present invention will become apparent form the following description taken in conjunction with the preferred embodiment thereof with reference to the accompanying drawings, in which.

DETAILED DESCRIPTION OF THE PREFERRED EMBODIMENTS OF THE PRESENT INVENTION

Figure 1:
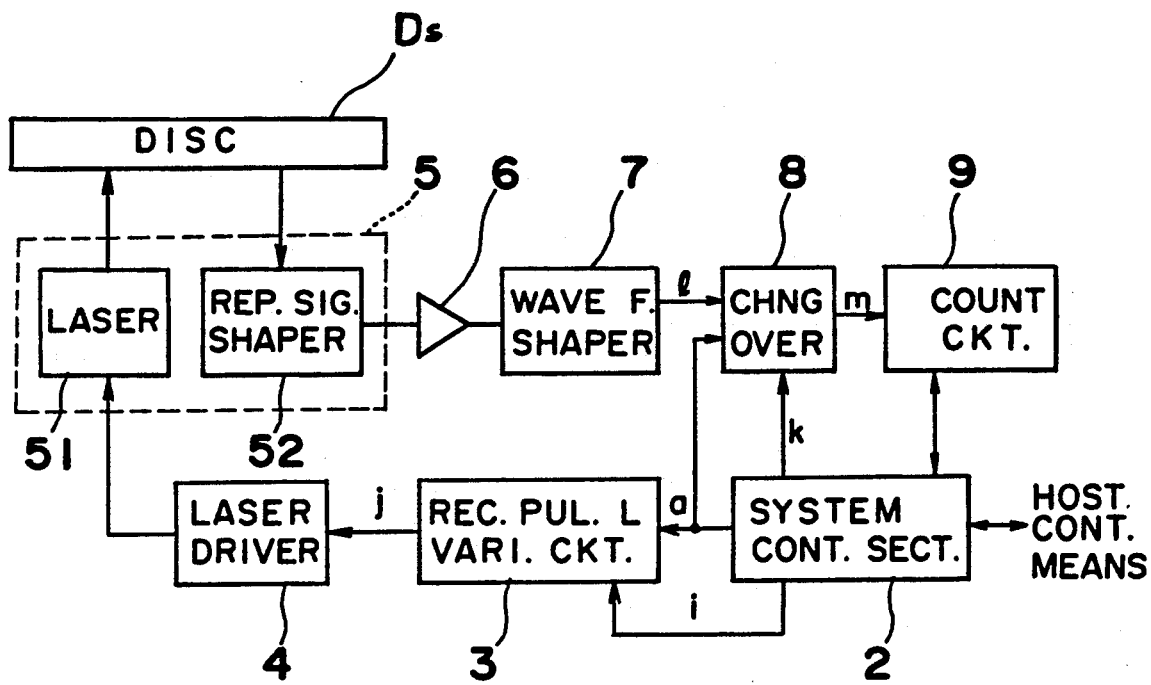
FIG. 1 is an electrical block diagram illustrating the general construction of a recording and reproducing apparatus according to one preferred embodiment of the present invention.

Before the description of the present invention proceeds, it is to be noted that like parts are designated by like reference numerals throughout the accompanying drawings.

Referring now to the drawings, FIG. 1 illustrates a recording and reproducing apparatus according to a preferred embodiment of the present invention. The apparatus is so arranged that, in addition to the ordinary function for recording and reproducing signals in a predetermined recording format on the surface of a disc divided into a plurality of sectors, based on instructions from a host controller, a recording condition self-setting function is provided for effecting an optimum recording condition setting as described in detail hereafter.

In FIG. 1, the recording and reproducing apparatus generally includes a system control section 2 for receiving instructions from a host controller, a recording pulse length variable circuit 3, a laser driver 4, an optical pick-up 5, an amplifier 6, a wave form shaper 7, a change-over unit 8, and a counting circuit 9 which are connected to each other and coupled to the system control section 2 as illustrated for recording onto or reproducing from an optical disc Ds.

An original recording signal a outputted from the system control section 2 is applied to the recording pulse length variable circuit 3. The original recording signal a referred to above is a digital modulation pattern which is subjected to formating by an ordinary recording format.

Figure 2:
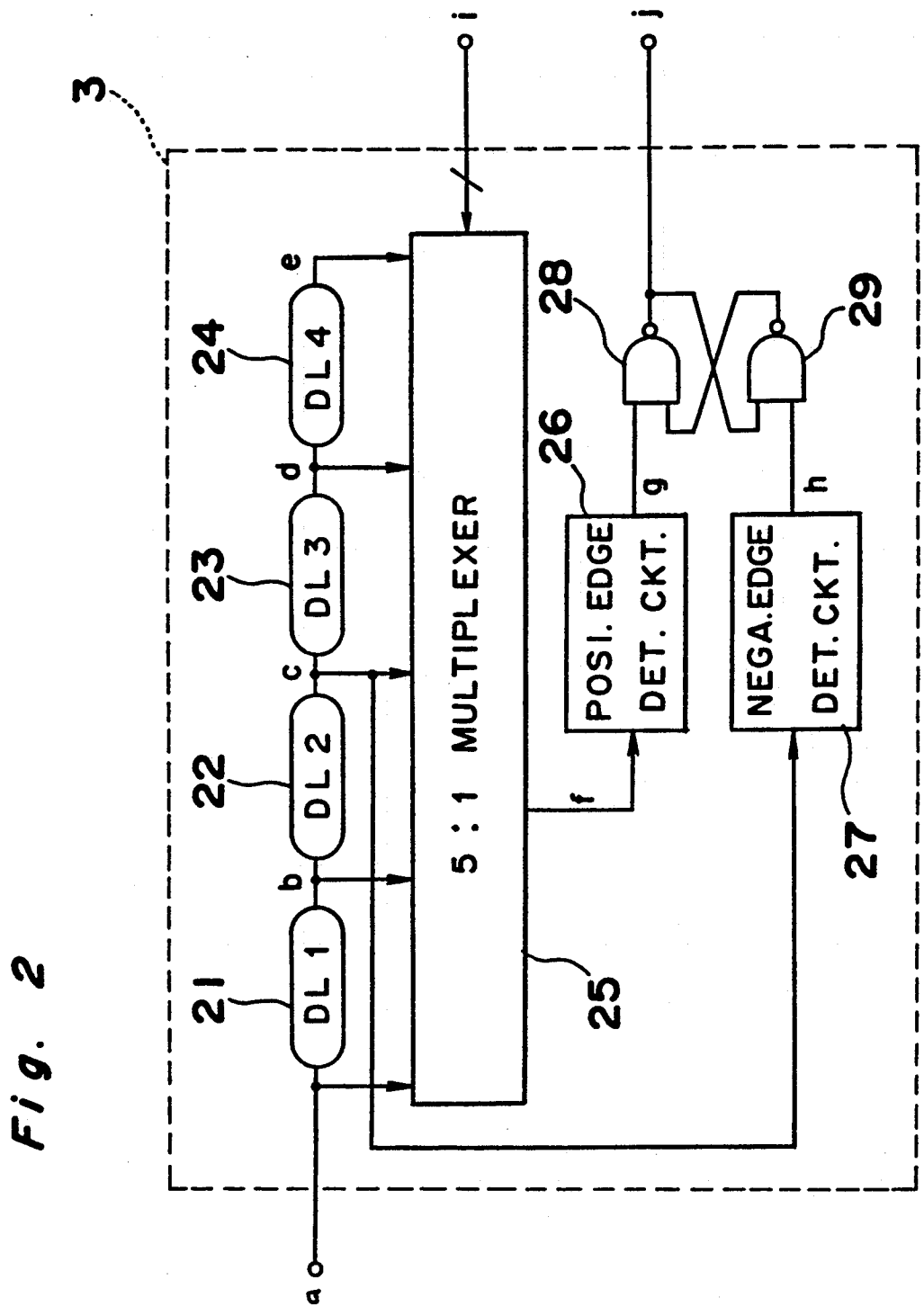
FIG. 2 is an electrical block diagram illustrating the construction of a recording pulse length variable circuit employed in the arrangement of FIG. 1.

As illustrated in FIG. 2, the recording pulse length variable circuit 3 further includes delay lines 21, 22, 23 and 24 connected to a 5:1 multiplexer 25, a positive edge detecting circuit 26, a negative edge detecting circuit 27, and NAND gates 28 and 29 which are connected to each other.

Figure 3:
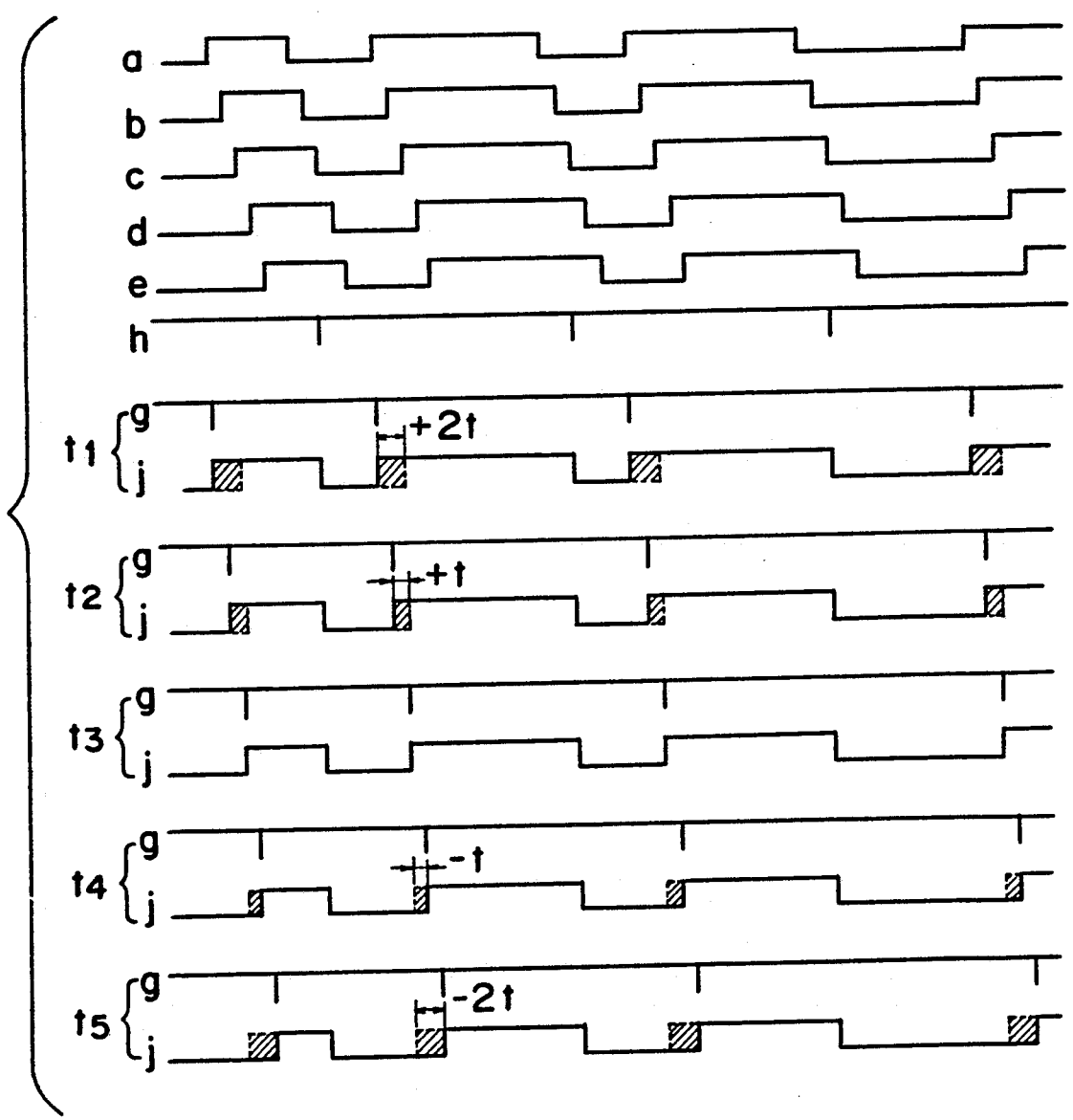
FIG. 3 is a diagram illustrating examples of output waveforms at various parts in FIG. 2.

When the original recording signal a is applied to the delay line 21, the signal is successively delayed by the delay lines 21, 22, 23 and 24, and delayed signals b,c,d and e are outputted from the respective lines 21 to 24 as illustrated in FIG. 3. These signals b,c,d and e and the original recording signal a are applied to the 5:1 multiplexer 25, where one of the signals b,c,d,e and a is selected based on a change-over signal i outputted from the system control section 2 so as to be outputted as an output signal f, which is also applied to the positive edge detecting circuit 26. This positive edge detecting circuit 26 outputs a short pulse g at the rising or positive edge of the output signal f, and the short pulse g is applied to the NAND gate 28 for setting a R-S flip-flop which includes the NAND gates 28 and 29.

On the other hand, the signal c obtained by delaying the original recording signal a by the delay lines 21 and 22 is applied to the negative edge detecting circuit 27. This negative edge detecting circuit 27 outputs a short pulse h at the falling or negative edge of the output signal c, and the short pulse h is applied to the NAND gate 29 for resetting the above mentioned R-S flip-flop. On the assumption that each of the delay lines 21,22,23 and 24 has a delay time t, the signal b is delayed by the time t with respect to the original recording signal a. Similarly, the signal c is delayed by the time 2t, the signal d by the time 3t, and the signal e by the time 4t. At this time, the original recording signal a is selected by the 5:1 multiplexer 25 according to the change-over signal i, and if the original recording signal a is outputted as the output signal f, the above mentioned, R-S flip-flop is set by the positive edge of the signal a, and is reset by the negative edge of the output signal c that is delayed from the signal a by the time 2t. Accordingly, the output signal j becomes a pulse signal in which the pulse length at high level side is increased by the time 2t with respect to the original recording signal a.

Subsequently, in a similar manner, the output signal j provides a pulse in which the pulse length at the high level side is increased by the time t with respect to the signal a by the selection of the output signal b, while providing a pulse without an increase or a decrease through the selection of the output signal c. By the selection of the output signal d, the signal j provides a pulse decreased by the time t, while, upon selection of the output signal e, the signal provides a pulse decreased by the time 2t. In other words, upon inputting the original recording signal a into the recording pulse length variable circuit 3, the signal j is outputted in which the pulse length is varied from that of the original recording signal a by any of the time periods +2t, +t, ±0, −t and −2t according to the change-over signal i.

During the recording, the system control section 2 changes over the signal i per each sector so as to produce the recording signal having different recording pulse lengths for each sector, and drives the laser driver 4 based on such recording signals having different pulse lengths so as to irradiate the laser light beam from a laser 51 within the optical pick-up 5. Thereby, the recording of the recording signal is performed on the surface of the rotating disc 1. Accordingly, on the above disc 1, the signals having different recording pulse lengths are recorded in the respective sectors. In the present embodiment recording is effected by the five recording conditions, i.e. recording pulse lengths of +2t, +t, ±0, −t and −2t in the respective sectors 1 to 5. On the other hand, along with the above recording function, the original recording signal a is applied to the change-over unit 8, which is changed over to the original recording signal a by a control signal k during the recording and also, to the reproduction signal l during the reproduction, and the recording/reproducing signal m is applied to the counting circuit 9. Accordingly, during the recording function, the reference recording data is outputted as the recording/reproducing signal m without altering the recording pulse length (i.e. the original recording signal (a).

Figure 4:
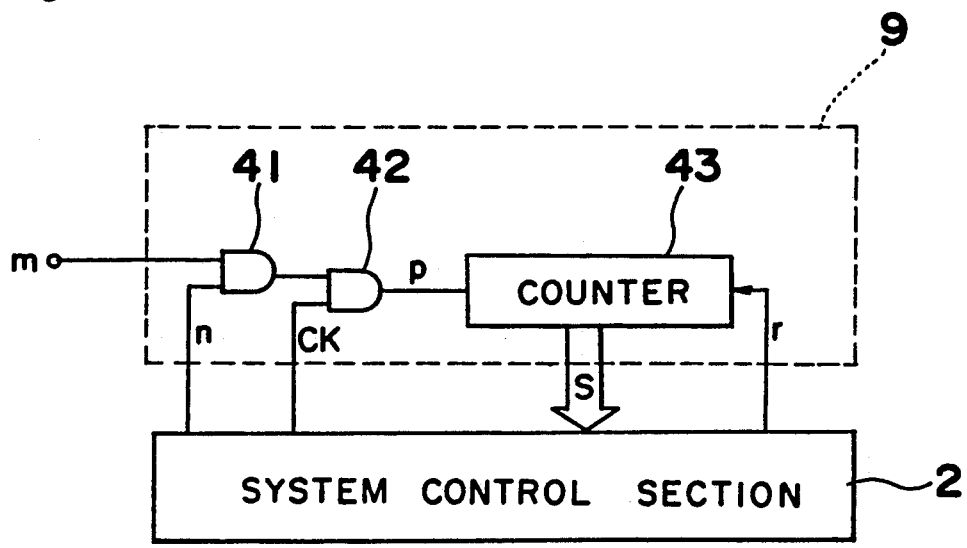
FIG. 4 is an electrical block diagram illustrating the construction of a counting circuit in FIG. 1.

As illustrated in FIG. 4, the counting circuit 9 includes AND gates 41 and 42 and a counter 43 connected to each other and coupled with the system control section.

The recording/reproducing signal m applied from the change-over unit 8 by the sector unit and the timing signal n applied from the system control section 2 are inputted to the AND gate 41. Then by the AND gate 41, masking of the data unstable portion of the above recording/reproducing signal m is effected, while simultaneously, cutting out of the above recording/reproducing signal m is effected in accordance to the counting of the number of bits in the predetermined reference time determined by the pulse width of the timing signal n. Thereafter, the output signal from the AND gate 41 and the counting clock signal CK outputted from the system control section 2 are applied to the AND gate 42, and only the bits at the recording side (the "H" level in the present embodiment) are outputted as a clock signal p of the counter 43. After having been reset by a reset signal r outputted from the system control section 2, the counter 43 integrally counts only the effective recording side bits within the predetermined reference time in the sector for the inputted recording-/reproducing signal m, so as to output a resultant signal s to the system control section 2. It is to be noted here that, in order to improve the accuracy for the integral counting in the counter 43, a frequency sufficiently higher than the frequency of the recording/reproducing signal m, and indivisible by the frequency of the signal m is employed for the clock signal CK.

Accordingly, in the above recording function, the system control section 2 records on the disc Ds, the recording signal in which the recording conditions (i.e. pulse length in the present embodiment) are altered for each sector, while the integral counting value of the original recording signal a by the counting circuit 9 is obtained to provide a reference value no.

Meanwhile, during the reproduction, the recording signal recorded on the disc Ds by the above recording function is detected by the reproducing signal detector 52. After being amplified by the amplifier 6, the recording signal is binary-coded by the waveform shaper 7 so as to be successively outputted as the reproducing signal l referred to earlier. The above mentioned waveform shaper 7 functions to effect the binary coding by setting a central level obtained from the positive/negative envelope of the applied reproducing signal as a threshold value. As described above, the change-over unit 8 selects the reproducing signal l based on the control signal k outputted from the system control section 2 during the reproduction, and this selected reproducing signal l is applied to the counting circuit 9 as the recording/reproducing signal m. In a similar manner as in the recording referred to earlier, the counting circuit 9 integrally counts the recording side bits of the recording/reproducing signal m (i.e. the reproducing signal l) per each sector, and provides the values as $n_1$ to $n_5$ which correspond to the respective sectors 1 to 5.

It is to be noted here that the system control section 2 is so arranged as to effect a comparison of the values $n_1$ to $n_5$ reproduced according to the recording conditions with respect to the reference value no of the integrally counted value obtained during the recording described earlier. By selecting the recording condition at the sector with the most appropriate result (e.g. the value nearest to no), the subsequent normal recording is enabled to be effected under the optimum recording conditions.

Figure 6:
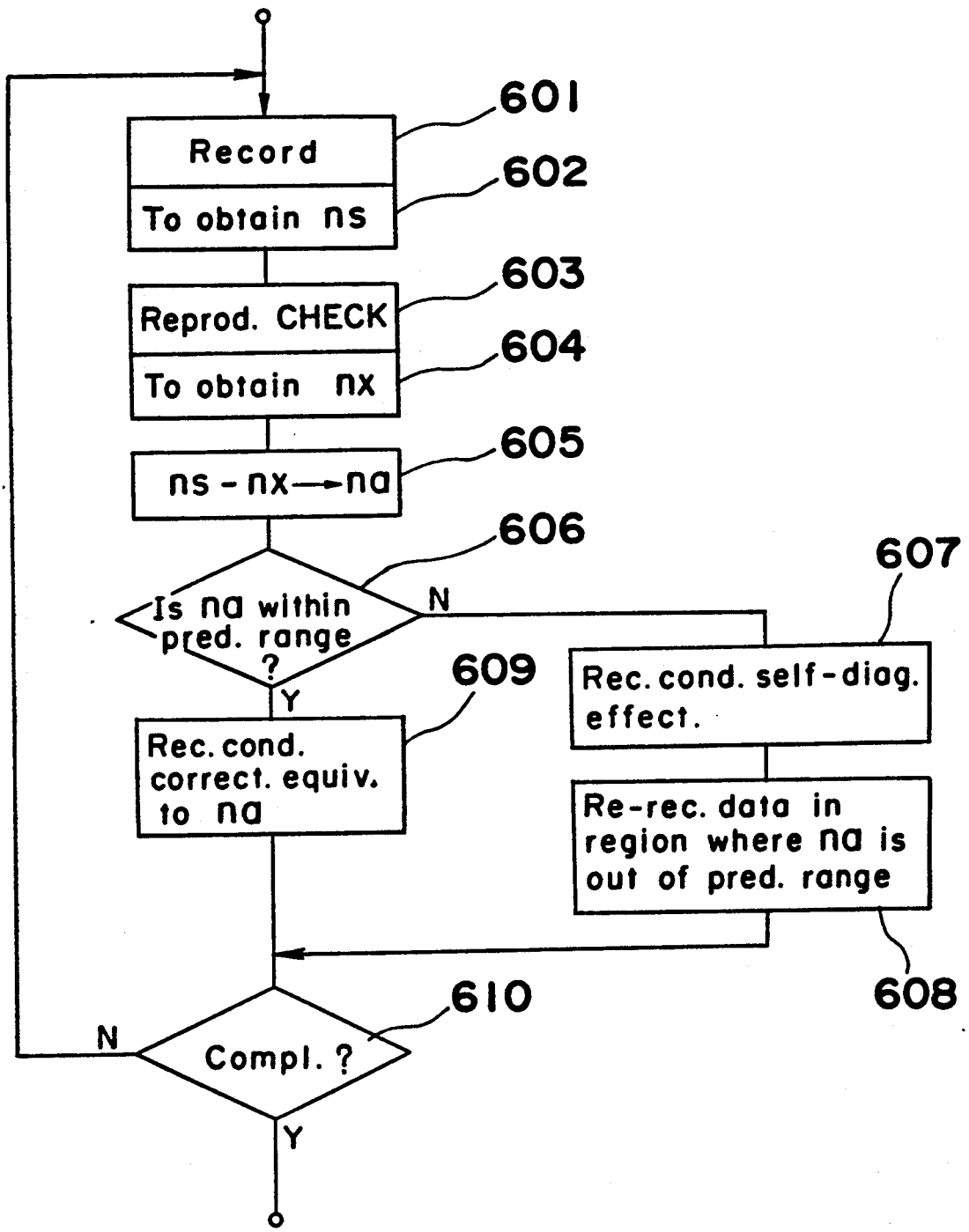
FIG. 6 is a flow-chart for explaining the functions of the recording and reproducing apparatus of FIG. 1.

The apparatus of the present invention has the self-diagnosing mode as described above, and effects the functions to be explained hereinbelow with reference to the flow-chart of FIG. 6.

Upon receiving the recording instruction from the host controller means, the system control section 2 first effects the recording in the designated sector by a predetermined (or previously set) recording pulse length (Step 601). At the same time, the recording signal a is applied into the counting circuit 9 through the change-over unit 8 in a similar manner as described earlier for obtaining the reference value ns of the integral counting value (Step 602). Subsequently, the system control section 2 enters the reproduction checking function of the recorded sector (Step 603), and applies the reproducing signal l to the counting circuit 9 through the change-over unit 8 in a similar manner as before so as to obtain the integral count value nx (Step 604). Here, a difference na between the reference value ns and the reproduction check result nx is obtained (Step 605) for determining whether or not the value na is within the predetermined range (Step 606).

The above described range is set to a value that will provide a sufficient margin for the reproducing signal. In the case where the value na is out of the predetermined range, the recording conditions are brought into a proper range by executing the recording condition self-diagnosing (Step 607). Thereafter, re-recording is effected with respect to the sector in which the predetermined recording state was not obtained (Step 608).

Meanwhile, in the case where the value na is out of the specific range, corrections of the recording conditions are effected by the value at the time (Step 609). Such correction values may be preliminarily held in a table or the like as a recording condition correcting amount necessary for the value na, i.e. as a recording pulse length correcting amount in this embodiment. By the function as described above, optimum recording conditions are provided at all times with respect to the recording data.

It is to be noted here that, in the foregoing embodiment, although the counting is effected as the integral counting only at the recording side bits in the counting circuit, unrecorded side bits may of course be adopted. Moreover, the detection at a higher accuracy can be achieved, if the counting is effected (parallel counting or up/down counting) respectively for the recorded side/unrecorded side bits, and that, although the integral counting value within the specific time period is adopted in the embodiment, it may be so modified, for example, to employ a managing system of the counting region by the number of bits.

Furthermore, in a modulation system in which the recording signal cancels a DC component (e.g. EFM, 8/10 MNRZi, etc.), the reference value of the integral counting has been determined irrespective of the contents of data to be recorded (at a value equivalent to ½ of the time for the counting region). Therefore, it becomes unnecessary to obtain the reference value during the recording for further facilitation of the control.

It should also be noted that, in the foregoing embodiment, although alterations of the recording conditions are effected though variations of the recording pulse length, similar results may be obtained by varying the recording laser beam power.

Figure 5:
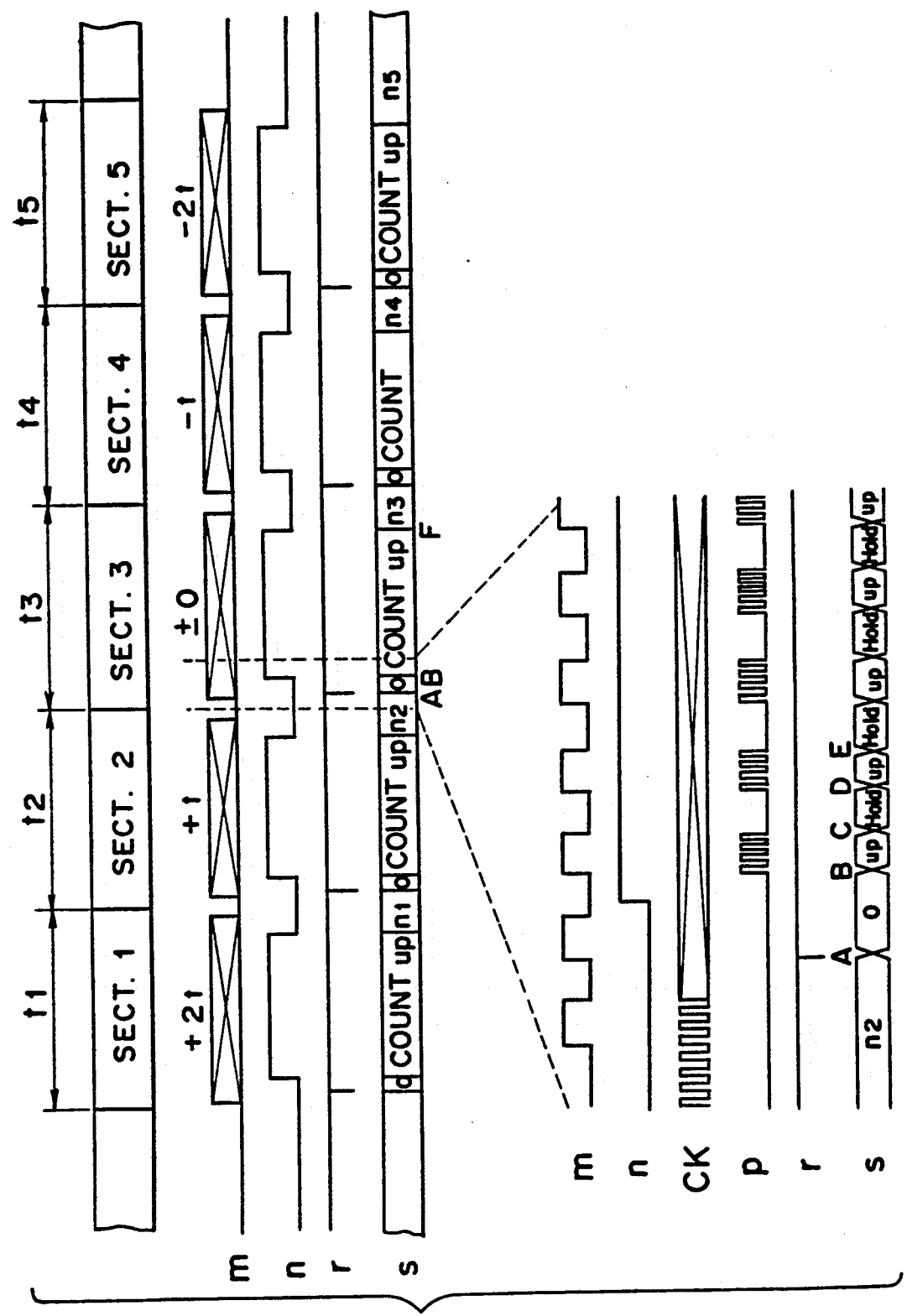
FIG. 5 is a diagram illustrating examples of timing waveforms for explaining the functions of the counting circuit of FIG. 4.

Referring to FIG. 5, which illustrates the relation between respective signals inputted into or outputted from the counting circuit 9 during the reproduction, the pulse widths of the recording/reproducing signal m (equal to the reproducing signal l in the case of reproduction) are $+2t$ for the sector 1, $+t$ for the sector 2, $\pm 0$ for the sector 3, $-t$ for the sector 4 and $-2t$ for the sector 5 according to the recording described earlier.

Meanwhile, in the diagram at the lower portion in FIG. 5, illustrating part of the sector 3 on an enlarged scale, the signal p is a logical sum of the signals m, n and CK. The signal s is reset by a reset signal r (the signal s is 0) at a point A, and the number of pulses of the signal p is counted up between points B and C, with the counting up being continued again between points D and E. Subsequently, such functions are repeated, whereby the integrating count value $n_3$ is obtained at a point F where the signal n becomes "L".

At this time, the system control section 2 compares the reference value $n_0$ of the integrating count value obtained at the above recording time, with the integrating count values $n_1$ to $n_5$ according to the sectors obtained during the reproduction, and selects the recording condition (i.e. The pulse length in the present embodiment) in the sector with the most appropriate result (e.g. the value closest to $n_0$ for the values $n_1$ to $n_5$), as a necessary recording condition. Thereafter, in the normal recording based on the instruction from the host controller, the recording under the most appropriate conditions is executed. Accordingly, by effecting the above function when the optical disc Ds, which is the recording medium of the recording and reproducing apparatus, is exchanged or for each predetermined period of time, it becomes possible to effect the recording/reproducing under the optimum conditions at all time.

It is to be noted here that, in the foregoing embodiment, although only the recording side bits are counted for integration, the system may be so modified as to use the unrecorded side bits for the purpose. Also, a detection at a higher accuracy may be achieved if the recorded side bits/unrecorded side bits are respectively counted (parallel counting or up/down counting).

It should also be noted that in the arrangement for the above described embodiment, the integrating count value of the recording/reproducing signal m in the predetermined time period determined by the pulse width of the timing signal n is used as the judging value for the determination of the recording condition which may be so modified, for example, as to employ the counting time by the predetermined number of bits of the recording/reproducing signal m as the judging value for determining the recording conditions.

In the foregoing embodiment, the integrating count value of the original recording signal a is obtained as the reference value $n_0$ during the recording. However, in the case of the modulation system in which the recording signal cancels the DC component (e.g. EFM,8/10MNRZi), since the reference value of the integrating count value has been determined (equivalent to ¼ of the time for the counting region) irrespective of the contents of the data to be recorded, it becomes unnecessary to obtain the reference value of the integrating count value during the recording. Thereby, the control can be further facilitated.

It is to be further noted that, in the first embodiment as described so far, although the recording pulse length is varied for altering the recording conditions of the original recording signal, the arrangement may be so modified as to vary the laser power during the recording.

As is seen from the foregoing description, because, the recording and reproducing apparatus according to the first embodiment of the present invention is provided with the recording condition controller, a signal recording apparatus, a reproducing signal output apparatus and a recording condition setting apparatus which is so arranged to alter the recording conditions of the original recording signal in various ways for recording on the recording medium, and during the reproduction, the reproducing signal of the recorded signal may be compared with the original recording signal for selecting the recording condition to obtain the reproducing signal generally equal to the original recording signal, it is possible to achieve stable functioning with respect to the difference in the recording sensitivity for the respective recording mediums or variations in the recording sensitivity of the recording mediums or in the laser power due to variations of the ambient temperatures, etc. for setting the optimum recording conditions at a high accuracy.

In the first embodiment of the present invention, the degree of the recording condition may be detected by the ordinary recording function and reproduction check function for determining the margin for the reproduction bits. Therefore, the reproduction check may be effected at a high reliability in combination with the determination of the number of errors commonly adopted.

Since the correction is effected to the optimum recording conditions at the time point when the variation of the recording condition is detected, even if the recording sensitivity is different for each recording medium of the laser power, and recording sensitivity of the recording medium, etc. are altered due to variations of the ambient temperatures and the like, the waiting time of the host controller may be reduced to a large extent, while the recording condition can be sucessively corrected even in the long time recording, etc. Thereby, recording under the optimum recording conditions is made possible at all times.

Figure 7:
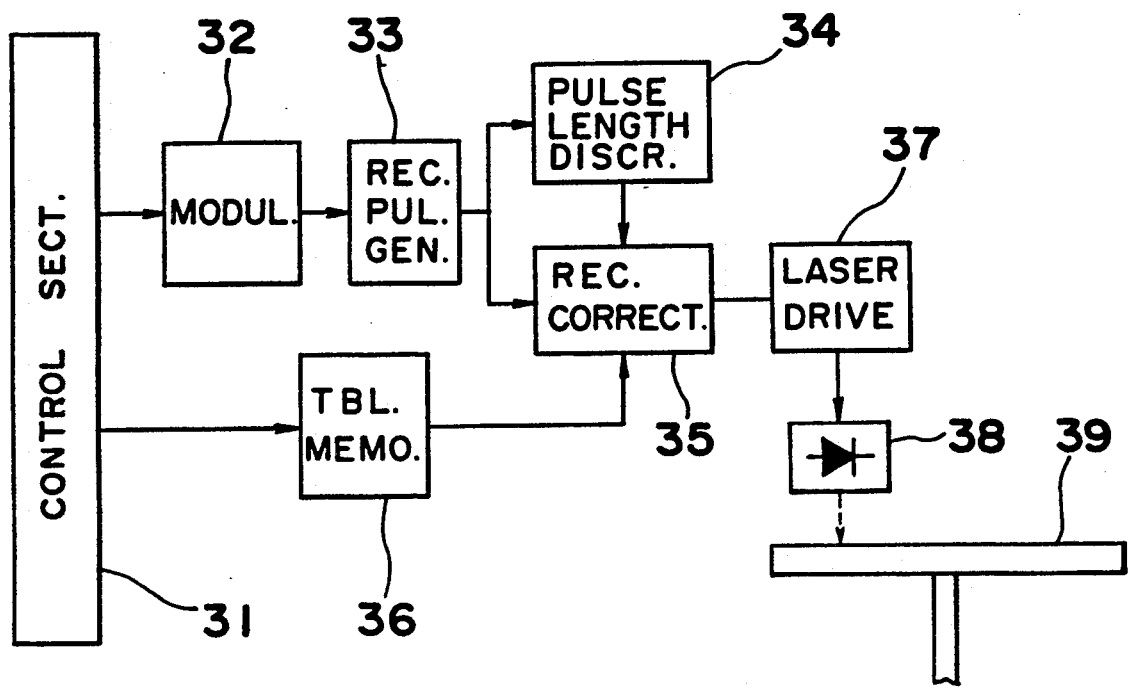
FIG. 7 is a schematic electrical block diagram illustrating an information recording control section of an optical information recording and reproducing apparatus according to a second embodiment of the present invention.

A block diagram of FIG. 7, which illustrates an information recording and control portion of an optical information recording and reproducing apparatus according to a second embodiment of the present invention, is referenced for further descriptions.

The arrangement of FIG. 7 includes a control section 31 for emitting data, a modulator 32 for subjecting the data from the control section 31, to digital modulation, a recording pulse generating section 33 for forming the digital data from the modulator 32 into a semi-conductor laser driving pulse, a pulse length discriminator 34, a recording correcting section 35 for correcting the pulse length based on the detection by the discriminator 34, a table memory 36 for storing the correcting amount for each pulse length, a laser driving section 37 for irradiating the beam based on the corrected pulse length, and an optical head 38 for recording onto or reproducing from the optical disc 39 as a recording medium, all of which are connected to each other as illustrated.

For the recording of information, the data delivered from the control section 31 is subjected to the digital modulation by the modulator 32. The digital data from the modulator 32 is further converted by the recording pulse generating section 33 into the semi-conductor laser driving pulse for forming the marks on the optical disc. In the above second embodiment, in order to vary the recording correction amount by the length of the mark to be formed, the system is so arranged as to vary the correction amount for the time length of the recording pulse for each mark length to be formed with respect to the train of pulses. Accordingly, the train of pulses outputted from the recording pulse generating section 33 is detected by the pulse length discriminator 34 for the time length of each pulse. Simultaneously, based on the time length of each recording pulse as detected by the record correcting section 35, each pulse is corrected in the time length thereof so as to be led to the laser driving section 37 thereafter. The laser driving section 37 forms the mark of a desired length on the rotating optical disc 39 by irradiating a beam of high output at the high level time (="1") of the corrected pulse train.

In the above described case, the correcting amount according to the time length of each pulse is controlled by the value stored in the table memory 36.

Meanwhile, according to the present embodiment, the optical disc 39 is moving with respect to the optical head 38 at a constant number of revolutions. Accordingly, since the moving linear speed of the beam and linear recording density are different due to the radial position of the optical head 38 for the optical disc 39, the optical disc control section 31 can set a proper correction varying amount according to the linear recording density, by controlling the address of the table memory 36 according to each radial position of the optical head 38.

Owing to the fact that the necessity for the recording correction due to heat diffusion or the like is particularly conspicuous in the case where the irradiating time of the high output beam onto the surface of the optical disc is short or when the moving distance of the high output beam on the surface of the optical disc is short, the system is so arranged in the present embodiment as to detect the pulse having the shortest time length in the pulses of the recording pulse train before the correction for imparting thereto a correction amount different from the amount for the other pulses.

Figure 8:
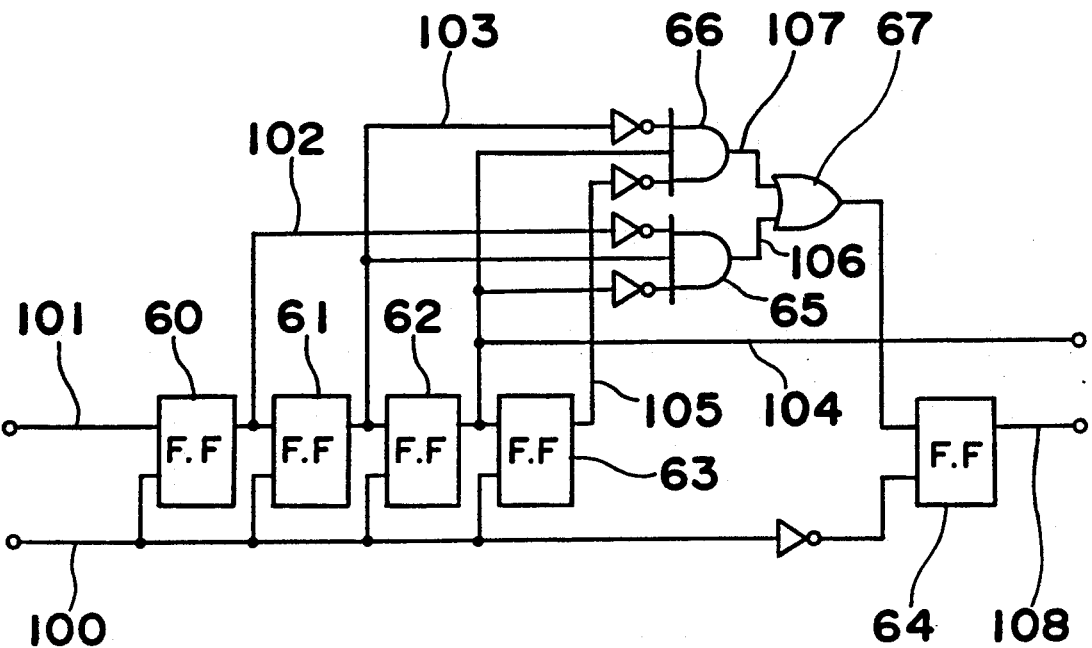
FIG. 8 is an electrical circuit diagram illustrating a specific construction of a pulse length discriminating section employed in the apparatus of FIG. 7.
Figure 10:
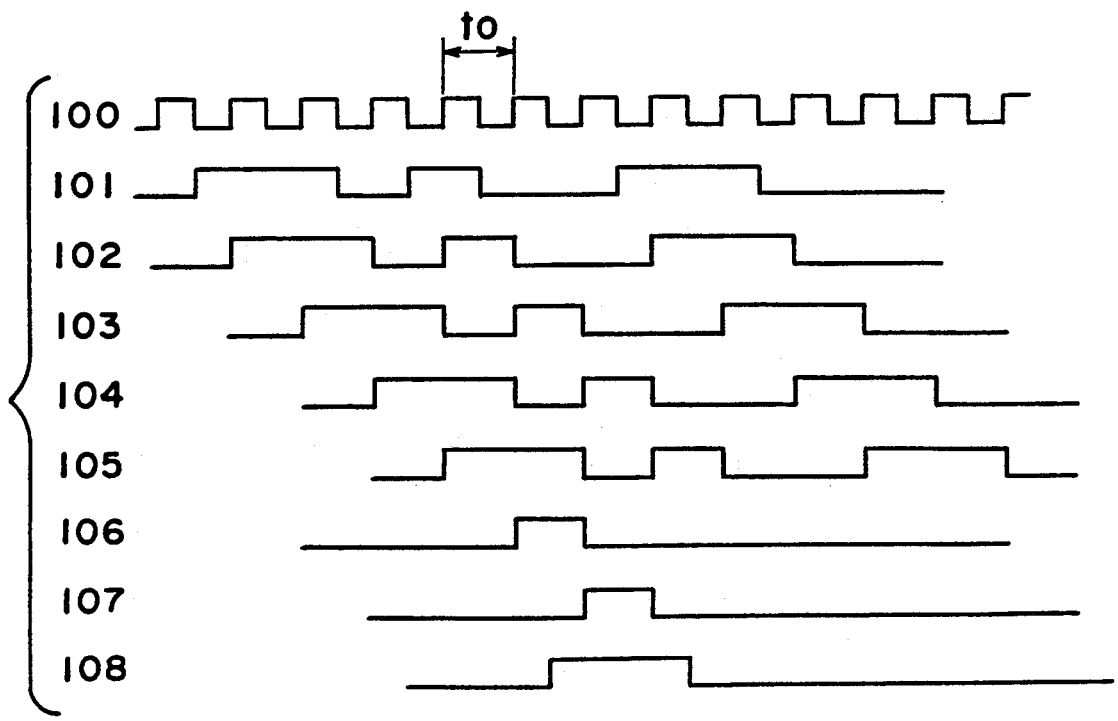
FIG. 10 is a time-chart illustrating waveforms for the circuit of FIG. 8.

FIG. 8 is a diagram illustrating a specific circuit construction of a pulse length discriminator 34 for detecting the pulse of the shortest time length. FIG. 10 is a timing-chart illustrating the waveforms for the circuit of FIG. 8, with the numbering of the waveforms in FIG. 10 corresponding to the numbering of signal lines illustrated in FIG. 8.

A clock signal (with a clock period of $t_o$) is applied to a signal line 100, while a train of recording pulses being synchronized in phase and having a plurality of time lengths in the integral multiple of the clock signal is inputted to a signal line 101 for being successively shifted by multi-stage flip-flops 60, 61, 62 and 63 coupled to the signal lines as illustrated.

The output of the flip-flop 60 through an inverter, the output of the flip-flop 61, and the output of the flip-flop 62 through another inverter are inputted to an AND gate 65. A pulse train delayed by 1.5 $t_o$ with respect to the recording pulse train input 101 is outputted to a signal line 106.

Similarly, the output of the flip-flop 61 through an inverter, the output of the flip-flop 62, and the output of the flip-flop 63 through another inverter are inputted to an AND gate 66. A pulse train delayed by 2.5 $t_o$ with respect to the recording pulse train input 101 is outputted to a signal line 107. The outputs of these AND gates 65 and 66 are inputted to a flip-flop 64 after being applied to an OFF gate 67. By applying the clock signal through the inverter, to the other end of the flip-flop 64, a shortest pulse length detection signal is outputted to a signal line 108.

Accordingly, the shortest pulse length detection signal outputted onto the signal line 108 corresponds to an output 104 of the flip-flop 62 delayed by 2.5 $t_o$ with respect to the recording pulse train input 101.

Figure 9:
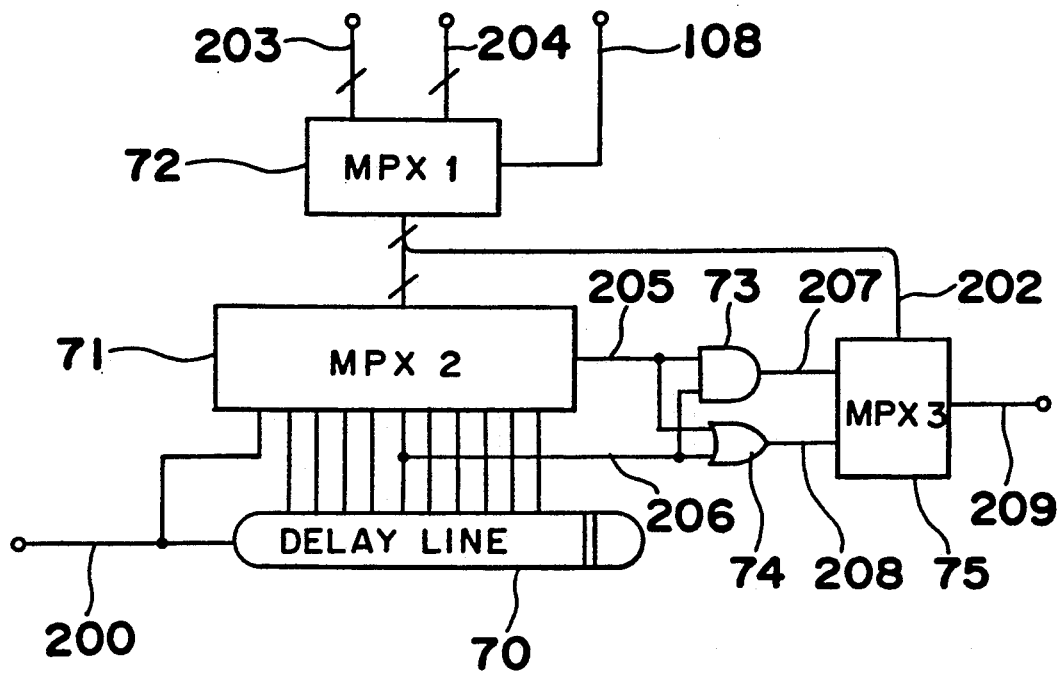
FIG. 9 is an electrical circuit diagram illustrating a specific construction of a record correcting section employed in the apparatus of FIG. 7.

FIG. 9 illustrates a specific circuit construction of a recording correcting section for varying the correcting amount with respect to the recording pulse train through the employment of the shortest pulse length detecting signal.

The recording pulse train 101 is applied, through a signal line 200, to a multi-tap delay line 70 which provides a delay amount of $\Delta T_0$ per one tap. Thus, the high level period of the recording pulse is decreased or increased by an AND gate 73 and an OR gate 74 which has as inputs, a tap output 206 providing, the delay amount which is about half of a total delay amount with respect to the input in the plurality of tap outputs, and an output 205 of a multiplexer 71 which selects one output of the plurality of tap outputs.

The alteration of the correcting amount with respect to the pulse of the shortest time length is effected by imparting to a group of input lines 203 and 204, the correcting value with respect to the shortest pulse length stored in the table memory and the correcting value with respect to other pulse lengths so as to change over the control signal of the multiplexer 71 for selecting the tap outputs of the multi-tap delay line 70 through the use of the multiplexer 72. Additionally, by using one bit of the correcting value with respect to the recording pulse as selected by the multiplexer 72, the selection of the output signal 207 of the AND gate 73 and the output signal 208 of the OR gate 74, i.e. the selection of an increase or a decrease of the time length for the recording pulse is effected. Thus, the final laser driving pulse is produced on an output line 209.

In this case, the selection control input of the multiplexer 72 are applied the shortest pulse length detecting signal 108 outputted from the pulse length discriminator in FIG. 8. Also, the output signal 104 of the flip-flop 62 of the pulse length discriminator of FIG. 8 through the input line 200 of the multi-tap delay line 70 are applied. Whereby it is made possible to alter the correcting amount with respect to the recording pulse having the shortest time length.

To hold correcting values in the table memory so that the tap output having a smaller delay amount than the tap output 206 is selected as the output of the multiplexer 71 during the decrease of the high level period of the recording pulse, while the tap output having a larger delay amount than the tap output 206 is selected during the increase of the high level period of the recording pulse, it is possible to effect correction with respect to the rear edge portion of the recording pulse at all times.

It is to be noted here that, in the above embodiment, although the recording correction is effected with respect to the time length of the recording pulse train, the practice may be modified. For example, the recording correction may be effected with respect to the crest value of the laser beam output driven by the pulse of the shortest time length in the recording pulse train.

In the second embodiment of the present invention as described so far, for recording marks of a plurality of kinds on the recording medium, it is possible to effect the favorable recording of the information by reducing influence due to heat diffusion, etc.

Figure 11:
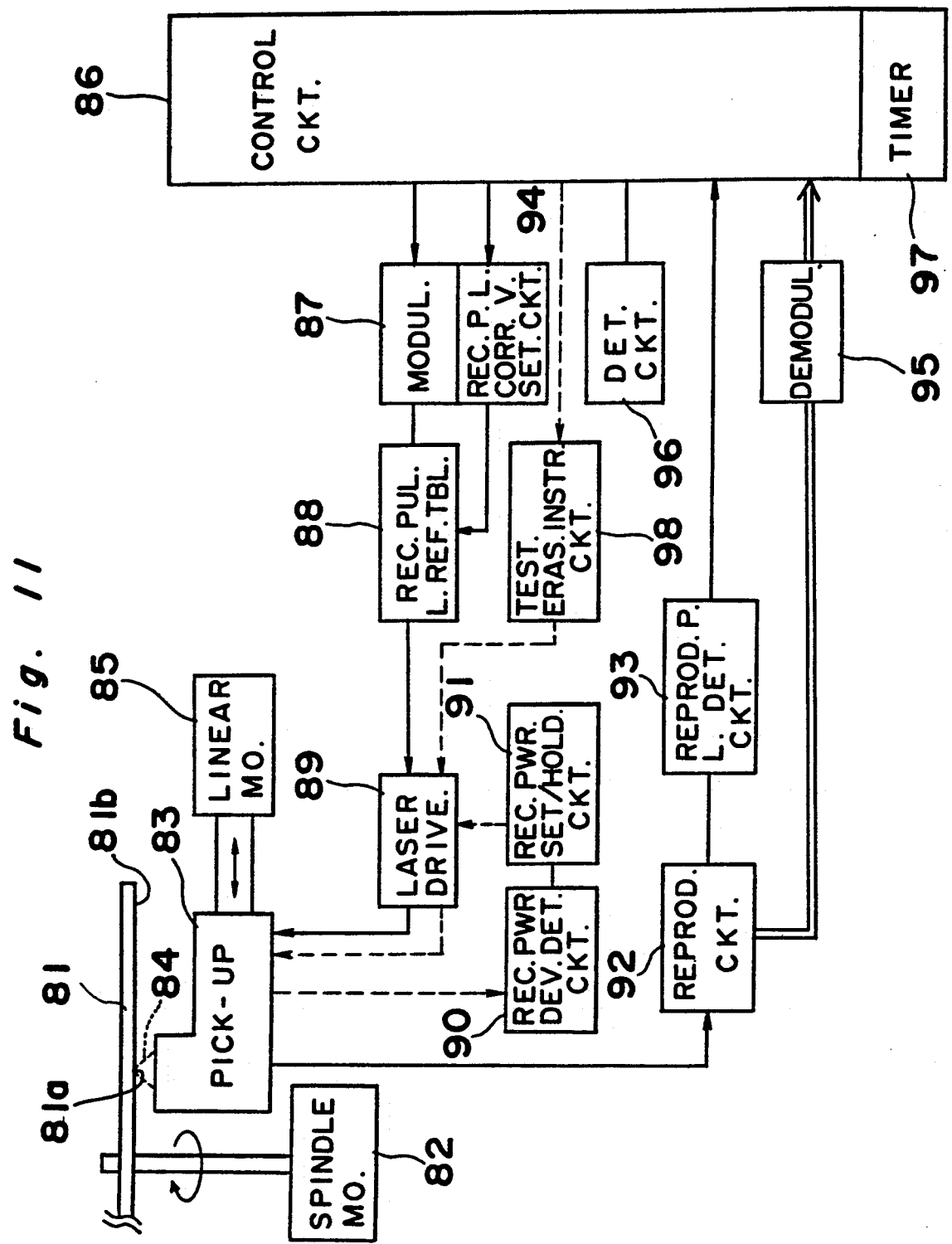
FIG. 11 is an electrical block diagram illustrating general construction of an optical disc apparatus according to a third embodiment of the present invention.

FIG. 11, which illustrates the general construction of an optical disc apparatus, is further referred to according to a third embodiment of the present invention.

In FIG. 11, the optical disc apparatus includes a spindle motor 82 which drives the rotation of an optical magnetic disc 81 supported thereon, a pick-up 83 incorporating a light converging optical system which emits a laser light 84 for recording erasing and reproduction, a linear motor 85 for driving the pick-up 83 in a radial direction of the disc 81, a control circuit 86 for controlling functions of respective blocks in the apparatus, a modulation circuit 87 for modulating the train of recording data outputted from the control circuit 86 into an on/off signal for the laser, a recording pulse length reference table 88, which stores a comparison table between the disc radial position and the optimum recording pulse length (FIG. 16), for adjusting the on/off signal from the modulation circuit 87 to the optimum pulse length corresponding to the disc radial position based on the instruction from the control circuit 86, a laser drive circuit 89 which amplifies the output signal from the recording pulse length reference table 88 to a predetermined power for irradiating the laser light 84 through the pick-up 83, a recording power deviation detecting circuit 90 which stores a comparison table between the ambient temperatures and optimum recording laser light power (FIG. 13) and is provided with a temperature sensor so as to detect the deviation between the optimum recording laser light power set by the comparison table and the recording laser light power obtained by a reflecting light amount signal of the recording laser light inputted through the pick-up 83 based on the ambient temperature as measured by the temperature sensor for correcting the recording laser light power based on the comparison table to eliminate the deviation, a recording power setting/holding circuit 91 which holds the power value of the recording laser light corrected by the recording power deviation detecting circuit 90 for setting the laser drive circuit 89 as the power value to be amplified, a reproducing circuit 92 for reproducing the read signal through the pick-up 83, a reproducing pulse length detecting circuit 93 for detecting the pulse length of the reproducing pulse outputted from the reproducing circuit so as to apply to the control circuit 86, a recording pulse length correcting value setting circuit 94 which holds the recording pulse length correcting value for removing the deviation between the pulse length of the recording pulse preliminarily memorized during recording by the control circuit 86 and the pulse length of the reproducing pulse so as to correct the recording pulse length reference table 88 by the correcting value, a demodulation circuit 95 for demodulating the signal from said reproducing circuit 92, a detecting circuit 96 for detecting the turning on of the power source as the conditions for effecting the automatic adjustments of the recording laser light power and recording pulse length to the optimum values and the exchange of the optical disc, a timer 97 for measuring the time for entering the automatic adjustment for a predetermined time period during the ordinary use, and a test erase instruction circuit 98 for communicating with the laser drive circuit 89, the recording power deviation detecting circuit 90, and the recording power setting/holding circuit 91 to function by the automatic adjustment processing starting instruction signal outputted from the control circuit 86 upon the receipt of the signals from the detecting circuit 96 and the timer 97, all of which are coupled to each other as illustrated.

In the lines connecting the respective blocks of FIG. 11, the dotted lines represent the flow of signals for setting the optimum recording laser light power in the automatic adjustment process, the solid lines represent the flow of signals for setting the optimum recording pulse length setting in the automatic adjustment process, and the double-solid lines denote the flow of signals in the ordinary process respectively.

Figure 15:
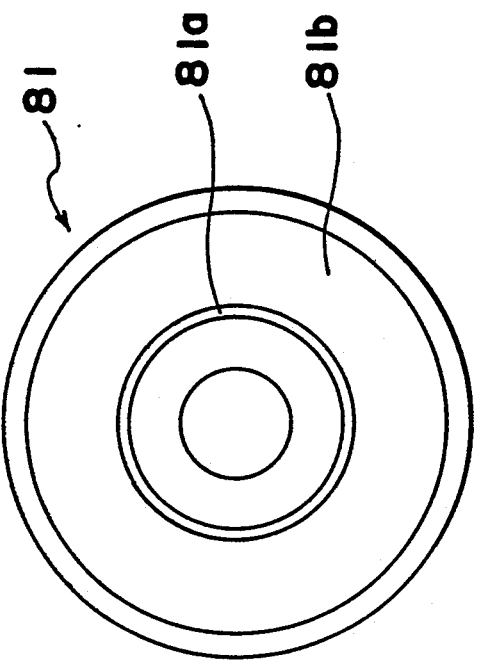
FIG. 15 is a top plan view of an optical disc.
Figure 17:
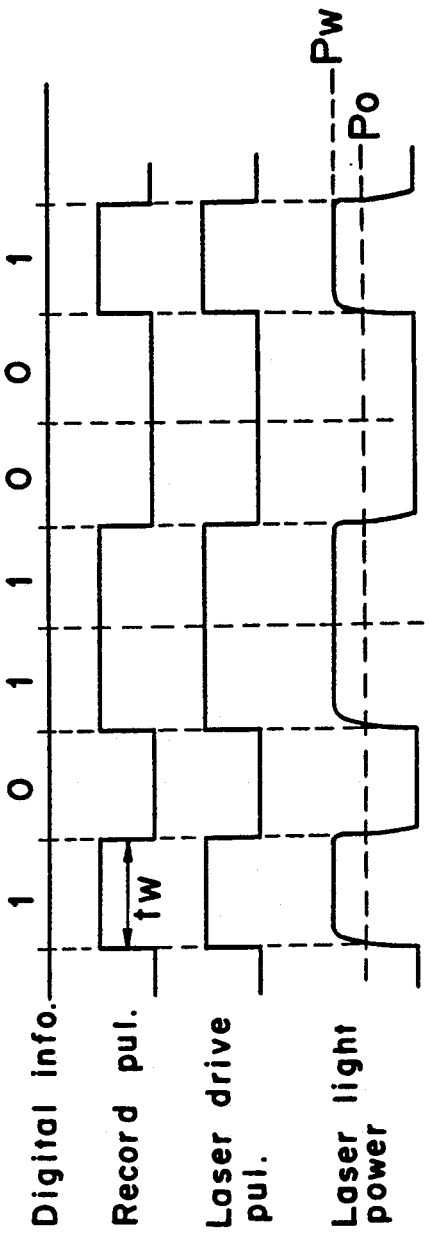
FIG. 17 is a diagram for explaining a conventional recording system using a laser light (already referred to).

More specifically, upon the instruction for the starting of the automatic adjustment process from the control circuit 86 as indicated by the dotted lines, the pick-up 83 is shifted to a predetermined automatic adjustment track 81a (FIG. 15) of the optical magnetic disc 81 by the linear motor 85 controlled by the control circuit 86, and the test erase mode is first entered. Whereby the laser light 84 is emitted from the pick-up 83 by the recording laser light power preliminarily held by the recording power setting/holding circuit 91. Meanwhile the recording power deviation detecting circuit 90 detects the deviation between the laser light power and the optimum recording laser light power at the ambient temperature so as to correct the recording laser light power for eliminating such deviation, and causes the corrected power value to be held by the recording power setting/holding circuit 91, which again sets the power value in the laser drive circuit 89. Thereafter, the test erase instruction circuit 90 is turned off so as to complete the setting of the optimum recording laser light power. Subsequently, the test write mode as indicated by the solid lines is entered, and the laser light 84 is emitted by the driving current outputted form the control circuit 86 through the modulation circuit 87, the recording pulse length reference table 88 and the laser drive circuit 89, and having the optimum recording pulse length corresponding to the disc radial position of the track 81a. Thereby the recording on the optical magnetic disc 81 is effected. Thereafter, the reproducing circuit 92 reproduces the recorded data read by the pick-up 83, and the reproduction pulse length detecting circuit 93 detects the pulse length of the reproduction pulse so as to be applied to the control circuit 86, which obtains the recording pulse length correction value so as to eliminate the deviation between the optimum recording pulse length and the pulse length of the reproduction pulse for output to the recording pulse length correction value setting circuit 94. This setting circuit 94 corrects the recording pulse length reference table 88 by the above correction value so as to return to the normal mode upon completion of the setting of the optimum recording pulse length. In the normal mode, the recording/reproduction is effected by the optimum recording laser light power thus set and the optimum recording pulse length.

Figure 12:
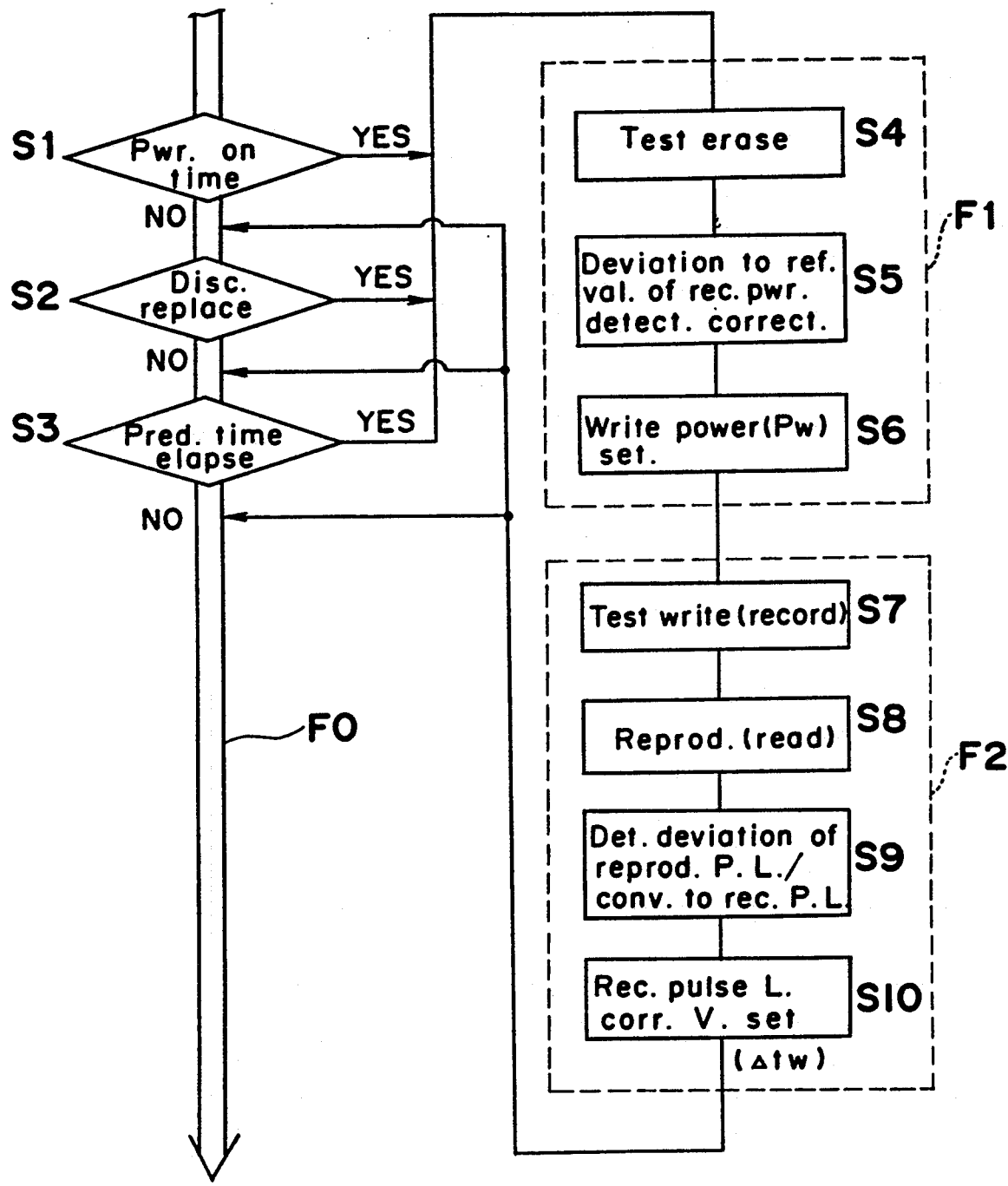
FIG. 12 is a flow-chart for explaining an automatic adjusting process for the optical disc apparatus of FIG. 11.

With reference to the flow-chart of FIG. 12, the automatic adjustment process of the optical disc apparatus having the constructions as described so far will be explained hereinafter.

Steps S1, S2 and S3

In a flow $F_o$ for the normal processing of the optical disc apparatus, when the power source turning on or optical disc exchange is detected by the detecting circuit 96 or a predetermined time is measured by the timer 97, the control circuit 86 starts the automatic adjustment process. The process includes a flow $F_1$ for setting the optimum recording laser light power by the test erase and another flow $F_2$ for setting the optimum recording pulse length by the test write.

Step S4

Figure 13:
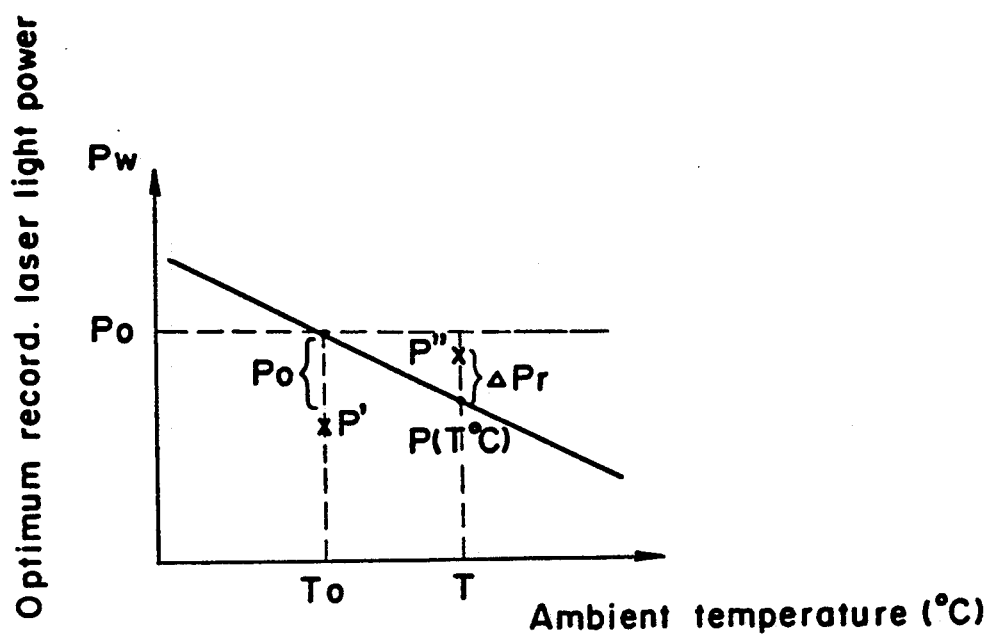
FIG. 13 is a graphical diagram illustrating the relation between the ambient temperature and the optimum recording laser light power.

The control circuit 86 drives the linear motor 85 to shift the pick-up 83 to the track 81a outside the user region 81b (FIG. 15) on the optical magnetic disc 81, and erases the track 81a by the laser light 84 having the predetermined erasing power. Such erasing power is set by the recording power deviation detecting circuit 90 as illustrated in FIG. 13. More specifically, the detecting circuit 90 obtains the optimum recording laser light power $P_o$ corresponding to an ambient temperature by the comparison table stored therein when the ambient temperatures as detected by the incorporated temperature sensor is $T_o°C.$, and adjusts the laser drive circuit 89 so as to output a driving current to provide such power value $P_o$.

Step S5

The laser light 84 emitted by the erasing power $P_o$ is monitored by the power deviation detecting circuit 90 through the pick-up 83. If the actually measured power at that time is P', which is lower than the optimum value $P_o$ as illustrated in FIG. 13, the circuit 90 corrects the laser driving current to eliminate the deviation $\Delta P_o$ between $P_o$ and P'. Thus, the corrected driving current value is held by the recording power setting/holding circuit 91 and is also set in the laser drive circuit 89, so that power of the laser light becomes the optimum value $P_o$. Meanwhile, as illustrated in FIG. 13, when the ambient temperature is at T° C., if the actually measured power of P'', which is higher than the optimum value P(T° C.), a similar correction is effected to eliminate the deviation $\Delta P_T$.

Step S6

In the manner as described above, the setting of the optimum recording laser light $P_w$ is completed at Step S6.

Step S7

Figure 14:
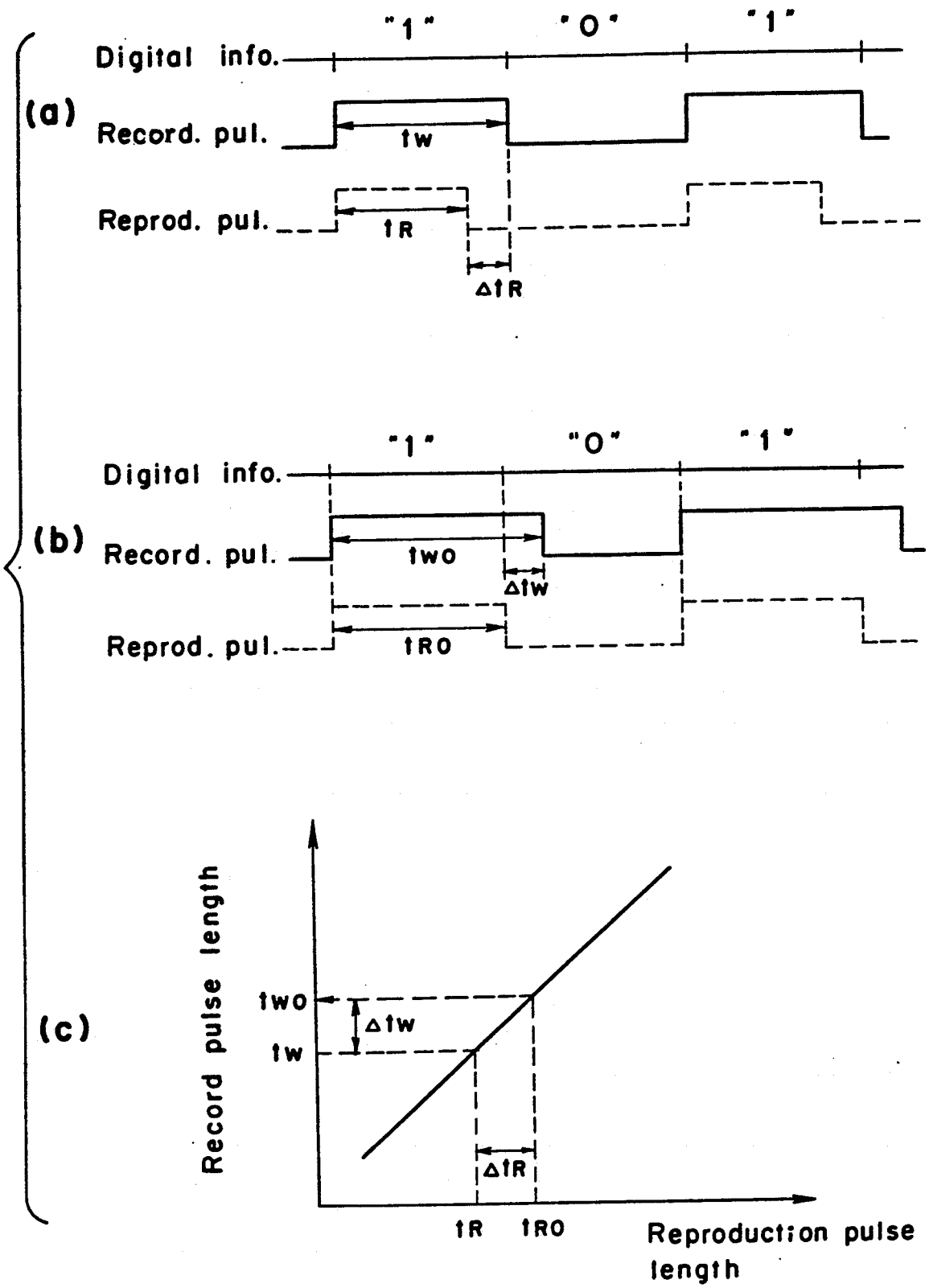
FIGS. 14(a) to 14(c) are graphical diagrams illustrating the relations between the recording pulse lengths and reproducing pulse lengths.

Subsequently, the control circuit 86 effects the recording on the track 81a by the laser light 84, which has the optimum recording laser light power as set. For this recording, the digital information as illustrated in FIG. 14(a) outputted from the control circuit 86 is modulated into a pulse train of the optimum pulse length tw corresponding to the disc radial position of the track 81a through the modulation circuit 87 and the recording pulse length reference table 88, and the pulse train is amplified to the power Pw by the laser drive circuit 89.

Step S8

The data thus recorded on the track 81a is subsequently reproduced by the reproducing circuit 92, and the reproduction pulse $t_R$ becomes shorter than the reference value of the reproducing pulse length by $\Delta t_R$ by represented the dotted lines in FIG. 14(a) due to the slippage in the recording sensitivity of the disc, etc.

Step S9

The above deviation $\Delta t_R$ is detected by the reproduction pulse length detecting circuit 93 and applied to the control circuit 86, which corrects the above value of the recording pulse length tw and eliminates the above deviation $\Delta t_R$. In other words, in order to increase the reproduction pulse length $T_R$ by $\Delta t_R$, the recording pulse length is rendered to be $tw_o$ by increasing the recording pulse length by $\Delta tw$ as compared with tw, and this $\Delta tw$ is applied to the recording pulse length correction value setting circuit 94 to be held therein.

Step S10

Figure 16:
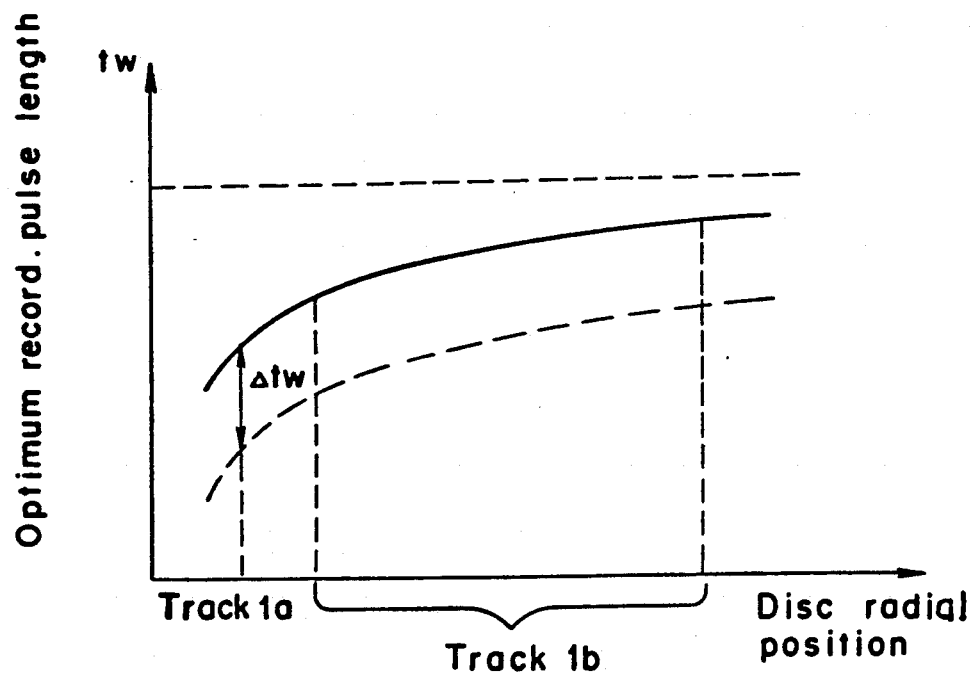
FIG. 16 is a graphical diagram illustrating the relation between the disc radial position and the optimum recording pulse length.

The recording pulse length reference table 88, which stores the comparison curve between the disc radial position and the optimum recording pulse length as illustrated by a dotted line in FIG. 16, causes the comparison curve to move parallelly upward by $\Delta tw$ as illustrated by a solid line, based on the correction amount $\Delta tw$ at the track 81a outputted form the recording pulse length correction value setting circuit 94. Thus, the setting of the optimum recording pulse is completed. In such a manner, the pulse length of the recording pulse through the recording pulse length reference table 88 is corrected to $tw_o$ as illustrated in FIG. 14(b), and the pulse length of the reproducing pulse is also corrected to the reference value $T_{Ro}$. The optimum recording laser light power Pw and the optimum recording pulse length $tw_o$ set in the manner as described above are retained until the automatic adjustment process of the next recording conditions is effected so as to be utilized during the recording of information onto the user region 81b of the optical magnetic disc 81 in the subsequent normal processing flow $F_o$.

In the above embodiment, from various parameters affecting the recording quality of the optical disc, the ambient temperature with respect to the optimum recording laser light power and the disc radial position with respect to the optimum recording pulse length which have the largest influence are selected so as to effect the corrections of deviations with respect to the optimum values including the influence by other parameters such as the change with time of the laser or scattering of the optical disc sensitivity, based on the two comparison curves thus stored. Therefore, an advantage is provided because the correction may be effected readily and accurately. Moreover, since this correction, i.e. the automatic adjustment process, is effected by the timer 97 at predetermined time intervals even during the normal use as well as during the power source turning on time period when there is a large variation in the ambient temperature or during an exchange of the disc when recording sensitivity tends to vary, it is possible to correct the recording conditions to the optimum value for each time. Furthermore, since the above automatic adjustment process is effected at the exclusive track 81a of the optical disc 81, there is no possibility that the information recorded on the user region 81b is destroyed. Accordingly, by the information thus recorded at the optimum conditions, judgement of the information is made accurate and easy at the reproduction, while the initial adjustment of the apparatus is simplified, and a marked improvement on the reliability of data results.

It is to be noted here that the recording condition correction during the normal use by the timer 97 as described in the above embodiment is not necessarily effected for each predetermined time period, and that such correction may be effected at a period other than the period during the power source turning on or an exchange of discs. Similarly, it is possible to replace the parameters of the optimum condition table with respect to the recording laser light power and recording pulse length by parameters other than the ambient temperatures and disc radial position.

As is clear from the foregoing description, in the optical disc device according to the third embodiment of the present invention, it is so arranged that the optimum condition table having values corresponding to the optimum value of the recording laser light power and the optimum value of the recording pulse length with respect to the parameters which affect the recording quality, is stored in the memory. Meanwhile, based on the values of the above parameters as measured, the deviation between the optimum values of the recording laser light power and the recording pulse length as determined by the above optimum condition table, and the recording laser light power and the recording pulse length as measured is detected by the deviation measuring apparatus. On the basis of the above detection signal, the recording laser light power and recording pulse length are controlled by the laser controller so as to eliminate the above deviation. Therefore, it is possible to stably record high quality data on the optical disc at a high reliability by properly setting the recording laser light power and the recording pulse length to the optimum values according to the variations of the parameters such as ambient temperatures and disc radial positions, etc. Thus, the information can be accurately and readily judged during the reproduction, with simultaneous simplification of the initial adjustment, and a marked improvement on the interchangeability of data, and dependability of the apparatus.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included therein.

What is claimed is:

1. A recording and reproducing apparatus comprising:
    system control means for developing a binary-coded original recording signal;
    recording condition control means for controlling recording conditions during the recording of said binary-coded original recording signal on a recording medium;
    signal recording means for recording said original recording signal onto said recording medium in response to said recording conditions set by said recording condition control means;
    reproducing signal output means for outputting a binary-coded reproducing signal by detecting said original recording signal as recorded on the recording medium by said signal recording means; and
    recording condition setting means for obtaining said recording conditions and developing a reproducing signal approximately equal to said original recording signal through a comparison between said binary-coded reproducing signal outputted from said reproducing signal output means and said original recording signal.

2. A recording and reproducing apparatus as claimed in claim 1, wherein said recording condition control means comprises pulse length control means for varying a pulse length of said original recording signal.

3. A recording and reproducing apparatus as claimed in claim 1, wherein said recording condition control means comprises light beam power control means for varying the power of a light beam during the recording.

4. A recording and reproducing apparatus comprising:
    a host control device for providing a plurality of instructions;
    recording pulse length control means for varying a recording pulse length by a predetermined amount;
    recording laser light beam generating means for varying the power of a recording laser light beam by a predetermined amount;
    counting means for counting length of bits at a recorded side or an unrecorded side for a reproducing signal or recording/reproducing signals for a predetermined time or a predetermined number of bits; and
    a recording condition self-diagnosing function for recording by successively varying said recording pulse length or the power of
    said recording laser light beam in response to said recording pulse length control means or said recording laser light beam generating means and setting said recording pulse length or the power of said recording laser light beam to conform therewith according to said counting means;
    said counting means functioning only in response to a recording instruction from said host control device or a reproduction checking so that said self-diagnosing function is initiated when the result of said counting means is out of a predetermined range with respect to a predetermined reference value.

5. A recording and reproducing apparatus as claimed in claim 4, wherein said recording pulse length or the power of said recording laser light beam is corrected when a difference of the results from said counting means for the recording and said reproduction checking is within said predetermined range, and said recording condition self-diagnosing function sets said recording pulse length or the power of said recording laser light beam when said difference of the results from said counting means is out of said predetermined range.

6. A recording and reproducing apparatus as claimed in claim 4, wherein after said recording condition self-diagnosing function is effected when a difference of the results from said counting means for the recording and said reproduction checking is out of said predetermined range, the recording is again effected with respect to date in a recording region determined to be out of said predetermined range.

7. A recording and reproducing apparatus as claimed in claim 4, wherein a comparison is made between said predetermined reference value in response to the operation of said counting means during the recording function by said recording instruction from said host control device and the result obtained upon the operation of said counting means during said reproduction checking after the recording corrects said recording pulse length or the power of said recording laser light beam based on the result of the comparison.

8. A recording and reproducing apparatus as claimed in claim 7, wherein said recording pulse length or the power of said recording laser light beam is corrected when a difference of the results from said counting means for the recording and said reproducing checking is within said predetermined range, and said recording condition self-diagnosing function sets said recording pulse length or the power of said recording laser light beam when said difference of the results from said counting means is out of said predetermined range.

9. A recording and reproducing apparatus as claimed in claim 8, wherein after said recording condition self-diagnosing function is effected when a difference of the results from said counting means for the recording and said reproduction checking is out of said predetermined range, the recording is again effected with respect to data in a recording region determined to be out of said predetermined range.

10. An optical disc apparatus comprising:
    pick-up driving means for controlling an irradiating position of a laser light beam onto an optical disc;
    memory means for storing an optimum condition table having a plurality of recording parameters which includes an optimum value for the recording power of said laser light beam with respect to said plurality of recording parameters, said optimum value for the recording power of said laser light beam being adapted to correspond to an optimum value for a recording pulse length;

measuring means for measuring the values for the recording power of said laser light beam, said recording pulse length and said plurality of recording parameters;

deviation detecting means for detecting deviations between said optimum value of the recording power of said laser light beam and said optimum value of said recording pulse length determined by said optimum condition table based on the values as measured by said measuring means and the recording laser light beam power and the recording pulse length measured by said measuring means, and developing a deviation signal corresponding to each of said deviations detected by said deviation detecting means; and laser control means for controlling the recording power of said laser light beam and said recording pulse length and eliminating said deviations based on each of said deviation signals from said deviation detecting means.

11. An optical disc apparatus as claimed in claim 10, wherein said pick-up driving means, said measuring means and said laser light control means are respectively arranged to function for a predetermined period of time during the replacing and during the recording of the optical disc.

12. An optical disc apparatus as claimed in claim 11, wherein said laser light beam irradiates tracks of the optical disc by said pickup driving means in a predetermined area of said optical disc when said measuring means and said laser light control means are functioning.

13. An optical disc apparatus as claimed in claim 11, wherein said optimum condition table stored by said memory means includes at least a first comparison table of ambient temperatures and said optimum value for the recording power of said laser light beam, and a second comparison table of disc radial positions and said optimum value of said recording pulse length.

14. An optical disc apparatus as claimed in claim 10, wherein said laser light beam irradiates tracks of the optical disc by said pick-up driving means in a predetermined area of said optical disc when said measuring means and said laser light control means are functioning.

15. An optical disc apparatus as claimed in claim 13, wherein said optimum condition table stored by said memory means includes at least a first comparison table of ambient temperatures and said optimum value for the recording power of said laser light beam, and a second comparison table of disc radial positions and said optimum value of said recording pulse length.

16. An optical disc apparatus as claimed in claim 10, wherein said optimum condition table stored by said memory means includes at least a first comparison table of ambient temperatures and said optimum value for the recording power of said laser light beam, and a second comparison table of disc radial positions and said optimum value of said recording pulse length.

17. A recording and reproducing method comprising the steps of:
(a) developing a binary-coded original recording signal;
(b) controlling recording conditions during the recording of said binary-coded original recording signal on a recording medium;
(c) recording said original recording signal onto said recording medium in response to said recording conditions set at said step (b);
(d) detecting said original recording signal as recorded on said recording medium;
(e) outputting a binary-coded reproducing signal by the detection at said step (d);
(f) comparing said binary-coded reproducing signal outputted at said step (e) and said original recording signal; and
(g) developing a reproducing signal approximately equal to said original recording signal by the comparison at said step (f).

* * * * *